Figure 1:
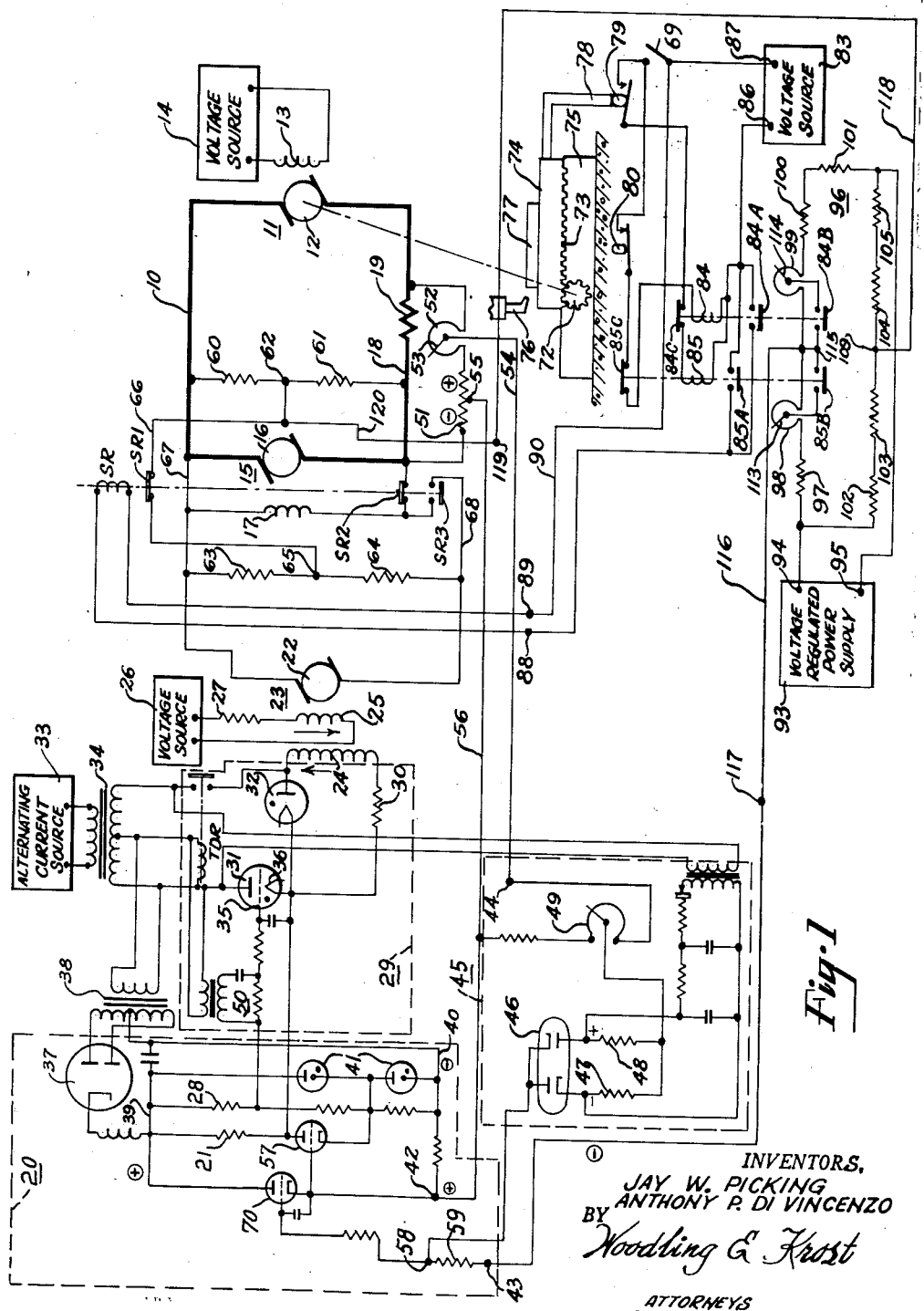

INVENTORS.
JAY W. PICKING
ANTHONY P. DI VINCENZO
BY Woodling & Krost
ATTORNEYS

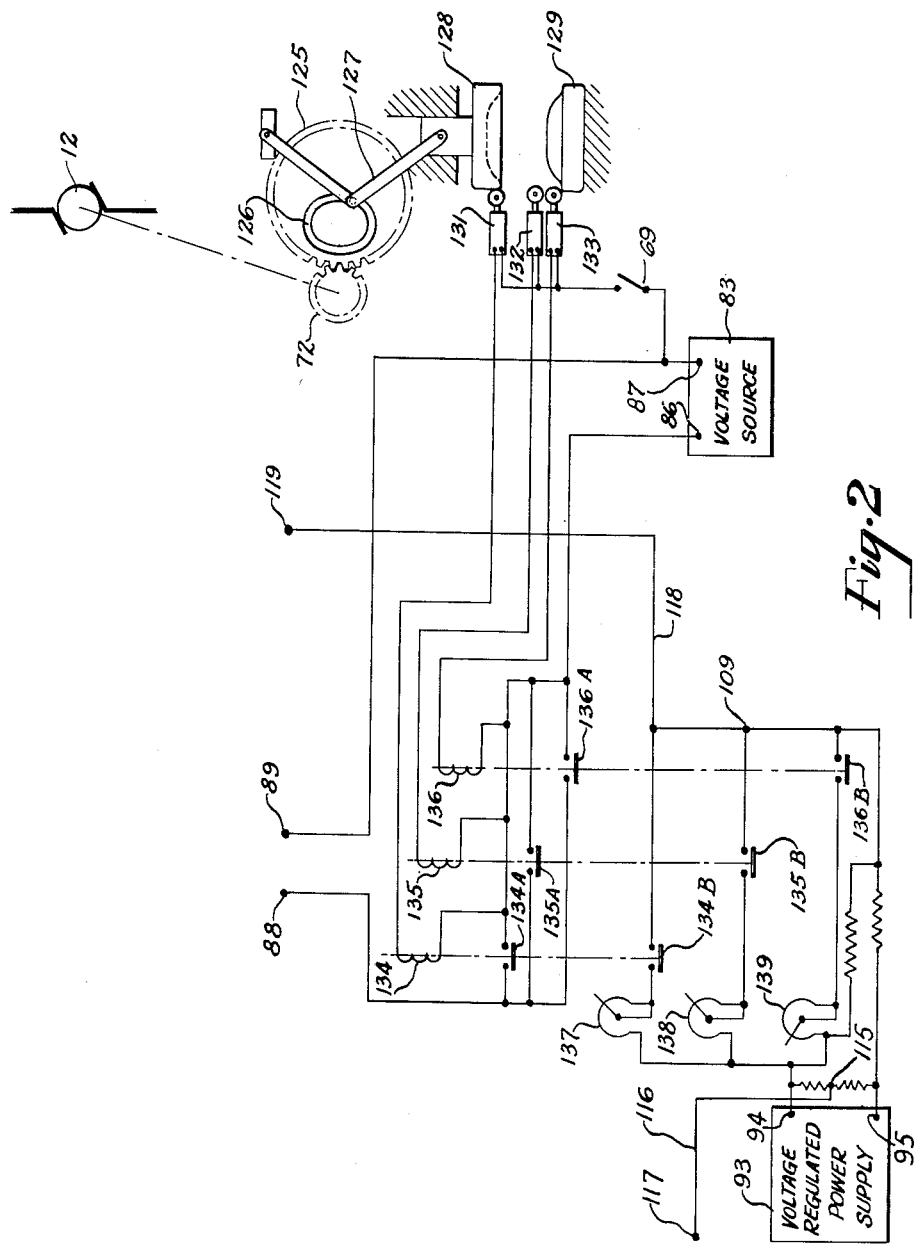

United States Patent Office 2,992,376
Patented July 11, 1961

2,992,376
GENERATOR CONTROL SYSTEM
Jay W. Picking and Anthony P. Di Vincenzo, Cleveland, Ohio, assignors to The Reliance Electric and Engineering Company
Filed Aug. 20, 1952, Ser. No. 305,344
13 Claims. (Cl. 318—158)

The invention relates in general to control systems for a direct current generator and more particularly to such generators with two field windings in opposition wherein one of the field windings is supplied by a rectifier or other unidirectional current conducting device.

This application is a continuation-in-part of the application, Serial Number 584,986, filed March 26, 1945, now Patent No. 2,636,692, entitled Control System, by J. W. Picking.

This invention relates to a system wherein a direct current generator may have a reversible voltage output even though the field windings of the generator are supplied by one or more rectifiers which are inherently unidirectional current devices. The preferred embodiment of the invention later described in detail shows a generator having two field windings which establish fields in opposition. One of the field windings is energized from any convenient source so that there is established a fixed field or at least a predetermined field for the generator. The other field winding is energized by a regulatable rectifier and establishes a field in opposition to the first mentioned field. This second field winding is capable of establishing substantially twice the ampere turns of the first field winding and hence when the energization to the second field winding is varied from zero to full value, the effective field on the generator is varied from full field in one direction, through zero field, and up to full field in the opposite direction. This means that the voltage output of the generator will likewise vary from a full value in one sense down through zero and up to full value in the opposite sense.

An object of the invention is to provide a generator control system with two field windings so that the voltage of the generator may vary from one polarity to the opposite polarity.

Another object of the invention is to provide a generator with a fixed field winding and a second field winding of twice the ampere turns and in opposition to the first field winding.

Another object of the invention is to provide a motor control system which has a motor armature responsive to the voltage of a generator and this generator is capable of having reversible polarity voltages controlled by the output of the regulatable rectifier with the rectifier controlled by a condition of the motor.

Another object of the invention is to provide a control system including two generators in cascade wherein the controlling generator has first and second field windings establishing fields in opposition so that by varying the values of the fields, the control generator may have alternative voltage polarities which it supplies to the field of the second generator. The system further includes switch means so that the field of the second generator may selectively be connected to this second generator as a suicide field and at the same time the control generator is then controlled by its output voltage.

Still another object of the invention is to provide a motor control system supplied by a control generator and a second generator in cascade with the motor driving a load and conditions of the motor and load controlling a regulatable rectifier which supplies variable energization to a first of two field windings on the control generator. A second field winding on the control generator supplies a substantially fixed amount of ampere turns to the control generator in opposition to the first field winding. The control generator normally supplies a voltage capable of being reversed in polarity to a field winding on the second generator. A voltage feed-back from the motor armature and a current feed-back from the motor armature current are used to control the regulatable rectifier. The current feed-back may dominate the control of the voltage feed-back upon excessive currents, either generative or re-generative. The field winding on the second generator may be reversibly connected to the armature of this second generator so that any voltage present at the armature acts to reduce the field flux causing this voltage, commonly known as a suicide field connection for a braking effect on the motor. At the same time, the voltage feed-back to the regulatable rectifier from another voltage feed-back on the control generator armature so that the regulatable rectifier is maintained in an operating range.

Other objects and a fuller understanding of this invention may be had by referring to the following description and claims, taken in conjunction with the accompanying drawing in which:

FIGURE 1 is a schematic diagram of a control system including the generator with two fields in opposition and controlling the voltage to a motor driving a typical load such as a reversible planer table; and FIGURE 2 is a schematic diagram of an alternative relay control means and a different load depicted as a sheet metal drawing press.

A direct current motor 11 includes an armature 12 and a second winding 13 supplied from any suitable source 14. The armature 12 is supplied with voltage from a D.-C. generator 15 which includes an armature 16 and a field winding 17. The armatures 12 and 16 are connected in loop circuit by the conductors 10 and 18 and the series resistance 19. The field winding 17 is normally supplied with voltage from the armature 22 of a control generator 23. The control generator 23 has first and second field windings 24 and 25, respectively, establishing fields in opposition and with the first field winding 24 capable of establishing substantially twice the ampere turns of the second field winding 25. The second field winding 25 is supplied with energy from any suitable source of fixed or predeterminable voltage 26 through an optional resistor 27. The first field winding 24 is supplied with voltage from a regulatable rectifier system 29 and through an optional resistor 30. The rectifier system 29 includes a controllable gas-filled rectifier tube 31 and a back rectifier tube 32. An alternating current source 33 supplies voltage through a transformer 34 to these tubes. The tube 31 has a grid 35 and a cathode 36 across which a variable bias is placed to control the current conduction through this tube 31. A rectifier 37 supplied from a transformer 38 supplies a positive voltage at the conductor 39 relative to the conductor 40. Voltage regulator tubes 41 maintain this rectified voltage substantially constant for an amplifier plate supply voltage. A portion of this plate supply voltage is that which is applied to the grid 35 relative to the cathode 36.

A voltage, phase shifted 90 degrees with respect to the plate voltage of tube 31, is supplied to the grid circuit of tube 31 by phase shift circuit 50. The variable triggering voltage for grid 35 of tube 31 is obtained from the variable voltage drop across plate load resistor 21 of tube 57 produced by control condition and bias resistor 28.

A two-stage D.C. amplifier 20 includes amplifier tubes 57 and 70, and has voltage control terminals 42 and 43 and current limit control terminals 42 and 58. The output of the amplifier 20 is connected to the rectifier system 29 for control thereof. A low resistance current limit circuit 45 having input terminals 42 and 44 is included as part of the circuit and supplies a current limit signal to terminals 42 and 58. This current limit circuit 45 has a low resistance compared to resistor 59 in the input of the voltage control. The current limit circuit 45 includes a duodiode 46 with the diode sections reversibly connected and has each diode section biased by the voltage across a resistance 47 and 48, respectively. A potentiometer 49 is connected in this current limit circuit 45 to control the amount of current limiting signals. A resistance 51 and potentiometer 52 are connected in series across the series resistance 19. The movable blade 53 of the potentiometer 52 is connected by a conductor 54 to the control terminal 44. A tap 55 on the resistance 51 is connected by a conductor 56 to the control terminal 42. Thus the current limit circuit 45 is supplied with a voltage proportional to the current flowing in the loop circuit 18 of the motor and generator 11 and 15, respectively. Resistances 60 and 61 are connected in series across the generator armature 16 with a tap 62 therebetween. Resistances 63 and 64 are connected in series across the control generator armature 22 with a tap 65 therebetween. The taps 62 and 65 are interconnected by a conductor 66 and a normally closed suicide relay contact SR1. A normally closed suicide relay contact SR2 connects one end of the field winding 17 to one side of the armature 16. A conductor 67 connects the upper side of the field winding 17 to the upper side of the armature 16. A normally open suicide relay contact SR3 connects the lower side of the field winding 17 to a conductor 68 which leads to the lower side of the armature 22.

The motor 11 is shown as driving a pinion gear 72 which engages a rack 73 on the table 74 of a planar 75. A tool 76 is shown diagrammatically to perform work operations on a workpiece 77 fastened to the table 74. A finger 78 is carried by the table 74 to engage and actuate limit switches 79 and 80, respectively. The switches 79 and 80 are normally closed switches with the switch 79 shown in the open position since it is engaged by the finger 78. A suitable voltage source 83 is used to energize control relays 84 and 85 through a start-stop switch 69. The control relay 84 has two normally open contacts 84A and 84B, and a normally closed contact 84C, and likewise the control relay 85 has normally open contacts 85A and 85B, and a normally closed contact 85C. The contacts 84A and 85A are connected in parallel and are connected between one terminal 86 of the voltage source 83 and a terminal 88. A conductor 90 interconnects a terminal 89 and a terminal 87 of the voltage source 83. When the start-stop switch 69 is closed, the relay 84 may be energized through the limit switch 80 and the contact 85C, and the relay 85 may be energized through the limit switch 79 and the contact 84C. The terminals 88 and 89 lead to a suicide relay SR.

A voltage regulated power supply 93 has terminals 94 and 95. A voltage divider network 96 is connected to the terminals 94 and 95. This network 96 includes the series connection of a resistance 97, potentiometers 98 and 99, and resistances 100 and 101 connected across the terminals 94 and 95. This network 96 further includes the series combination of the four resistances 102, 103, 104, and 105 connected across the terminals 94 and 95. The resistances 103 and 104 may have slide wire taps to obtain additional reference voltages. Movable contacts 113 and 114 on the potentiometers 98 and 99, respectively, are serially interconnected by the contact 85B, a terminal 115, and the contact 84B. A terminal 109 is connected between resistances 103 and 104. The terminals 109 and 115 may thus be considered the output terminals of the voltage divider network 96. The terminal 115 is connected by a conductor 116 to a terminal 117. The terminal 109 is connected by a conductor 118 to a terminal 119. The terminal 119 is connected by a conductor 120 to the tap 62.

Operation

The motor 11 is connected to the planer 75 to drive the table 74 in both cut and return directions. This means that the armature 12 must operate in forward and reverse directions. To reverse the direction of rotation of the armature 12, the polarity of the voltage of the generator 16 is reversed. This means that the direction of the field produced by the field winding 17 is reversed and hence the voltage output of the armature 22 is made to reverse. The output voltage of the armature 22 is reversible because the field produced by the winding 25 is at some fixed value and the field of the winding 24 is in opposition thereto and can vary from a lesser to a greater value. Therefore, the resultant field supplied to the generator 23 is reversible to reverse the output voltage of the armature 22.

The field winding 24 is supplied by the regulatable rectifier system 29, which in turn is controlled by the signal input voltage or voltage control signal across the terminals 42 and 43. This signal input voltage is the difference between a reference voltage obtained from the voltage divider network 96 and the voltage feed-back from the generator armature 16 across the feed-back resistance 61. This signal input voltage across the terminals 42 and 43 may be in the order of two volts. When the system is in operation in steady state conditions, the suicide relay SR is energized so that the contact SR2 is open and the contact SR3 is closed to energize the field winding 17 from the armature 22.

The planer 75 is diagrammatically shown in a position ready to commence the cutting stroke of the table 74. The finger 78 is depressing the switch 79 to open this switch. The relay 85 therefore cannot be energized, and the voltage source 83 will thereupon energize only the relay 84 through the start-stop switch 69, limit switch 80 and contact 85C, to close the contacts 84A and 84B. The closing of the contact 84A will cause energization of the suicide relay SR. The closing of the contact 84B will cause a certain reference voltage to be established between the terminals 109 and 115 as determined by the setting of the movable contact 114. This reference voltage between terminals 109 and 115 will be of one polarity and will give a signal to the rectifier system 29 through the D.C. amplifier 20 which, acting through the control generator 23 and generator 15, will bring the motor 11 up to a predetermined speed determined by the voltage feed-back from resistance 61 which will act in opposition to the reference voltage across terminals 109 and 115. To clarify this operation, the signal voltage applied to the amplifier tube 70 for one direction of rotation, which controls the rectifier system 29, can be traced from the cathode of the tube 70 to terminal 42, resistor tap 55, picking up a negative current signal in the left half of resistor 51 to provide IR drop compensation, then to conductor 18, through voltage feed-back resistor 61 to pick up a positive voltage proportional to armature voltage of generator 15, then through conductors 120 and 118 to the voltage divider network 96, where a negative voltage is picked up because contact 84B is closed, and then through conductor 116 to terminal 43 into the grid of the amplifier tube 70. The series resistance 19 develops a voltage thereacross proportional to the current in the armature 12. The resistance 51 and the potentiometer 52 therefore are used to obtain a certain proportion of this voltage as a current signal. The voltage between the tap 55 and the movable blade 53 is a current limit signal which is supplied to the terminals 42 and 44. Ordinarily this current limit signal has no effect during steady state conditions and is used only during acceleration and deceleration. During periods of acceleration and deceleration of the motor 11, the generative and regenerative currents through the armature 12 may tend to be quite high. In such case, the voltage across terminals 42 and 44 is increased. If the voltage between terminals 42 and 44 exceeds a predetermined value, then the bias across either resistances 47 or 48 will be exceeded and one section of the duodiode 46 will conduct. This conduction will over-ride the control normally effected by the voltage signal at terminals 42 and 43 because of the low resistance in this conduction path compared to the resistance 59. This prevents the current, either generative or regenerative, from exceeding a value as predetermined by the setting of the potentiometer 49.

When the finger 78 actuates the switch 80, the relay 84 would be deenergized, and with the closing of contact 84C, the relay 85 would be energized through limit switch 79. Energization of the relay 85 would close the contacts 85A and 85B. With the contact 85B closed, the reference voltage developed across terminals 109 and 115 would be of a polarity opposite to that formerly established. This gives a signal to the rectifier system 29 to change the value of energization of the field winding 24 such that the effective field on the control generator 23 is reversed. With the polarity of the voltage generated by the armature 22 reversing, the field winding 17 now establishes a field for the generator 15 such that the output voltage of the armature 16 is reversing. This rapidly reverses the direction of the motor 11 for the return stroke of the planer table 74. In the process of reversal of the voltage of armature 16, its voltage drops below the counter E.M.F. of motor armature 12, causing the motor to become the generator of the system, reversing the flow of current and power to the armature 16 of the generator 15, which now becomes the motor of the system dissipating the kinetic energy stored in motor 11 and the planer 75. This action is commonly known as regenerative braking. As the voltage of generator armature 16 passes through zero on its reversal cycle, generator 15 will again become the generator and motor 11 the motor, whereupon the motor 11 changes rotational direction and accelerates to a speed determined by the reversed voltage of generator 15 as determined by the reference voltage setting of the voltage divider network 96. If more rapid changes in armature voltage are desired, this can be accomplished by using a control generator 22 which can supply greater than rated ampere turns to field 17, or by over-exciting both fields 24 and 25 on generator 23. The rapidity of the reversing function is controlled by the size of the components in the entire control system and by the setting of the current limit circuit 45. The reversing function is continued until the reversed voltage developed across the feed-back resistance 61 is sufficient to be in opposition to the reference voltage across terminals 109 and 115 in the amount needed to maintain the rectifier system 29 in a steady state condition.

When the start-stop switch 69 is opened, neither relay 84 nor 85 is energized, and the suicide relay SR will be de-energized. This connects the field winding 17 by the contact SR2 to the armature 16 in a polarity opposite to that in which it was formerly energized. This is a suicide field connection, in that any armature voltage present reduces the field which reduces the armature voltage, and hence the voltage of the armature 16 rapidly will drop to zero. The contact SR1 will also be closed at this time to interconnect the taps 62 and 65. Since the voltage across the feed-back resistance 61 is dropping to zero, this means that the signal input supplied to the terminals 42 and 43 will be of a value sufficient to condition the rectifier system 29 such that the field winding 24 will establish the same amount of ampere turns as the field winding 25. Thus the armature 22 will have a zero output voltage and the feed-back resistance 63 will have zero voltage thereacross. This contact SR1 therefore assures that the rectifier 29 will be maintained within an operating range whenever the field winding 17 is connected in a suicide connection to the armature 16.

The FIGURE 2 shows a different form of relay control means and a load. The load shown in this FIGURE 2 is a diagrammatical showing of a toggle action sheet metal drawing press. The pinion 72 drives a speed reducing drive indicated by the gear 125, and eccentric 126 is driven by the gear 125 and actuates a toggle 127 to move a slide 128 of a press 129. The slide 128 is shown as capable of actuating switches 131 and 132 and 133. The start-stop switch 69 and the switches 131, 132, and 133, respectively, control relays 134, 135, and 136 for energization by the voltage source 83. The relays 134, 135 and 136 each have contacts denoted by the suffixes R and B, respectively. The contacts with the suffix A are paralleled and control the energization to the suicide relay SR through the terminals 88 and 89. Contacts with the suffix B are paralleled through potentiometers 137, 138 and 139 and connected between the terminals 109 and 115. A reference voltage is therefore obtainable across the terminals 109 and 115 and is supplied to the terminals 119 and 117.

The drawing press 129 may be a large drawing press as currently used in drawing the sheet metal bodies for automobiles. A press recently supplied with a control system according to this invention had a 500 horsepower motor directly connected to the toggle acting press. The motor 11 was geared down considerably so that the inertia of the parts of the press reflect practically no inertia to the armature 12. This motor 11 and generator 15 have a long time constant of approximately two or three seconds. This means that any field current change will require an elapsed time of two or three seconds to effect a 63.2 percent of the change and eight to twelve seconds to effect 98 percent of the change. This eight to twelve second elapsed time is much larger than can be tolerated in production operation of the press 129. Consequently field forcing is used which consists essentially of applying a considerable over-voltage to the field 24 and hence to the field 17, and this over-voltage is removed by the voltage feedback when the required motor armature voltage is reached. The converse is also true, because where one wishes to decelerate rapidly, the newly selected reference voltage from the voltage divider network 96 forces the rectifier system 29 to a voltage lower than that necessary for the new steady state condition. If required by the feedback system, the flux from field 24 can drop to less than that from field 25, to reverse the voltage from armature 22, thereby forcing the flux of field 17 and the voltage of armature 16 to the new steady state condition. This is where the current limit circuit 45 is most effectively used because on the field forcing, a heavy armature current is established. In this circuit of FIGURE 2, the motor 12 is not called upon to reverse, since the reversing function is mechanically provided for in the design of the toggle action press. However both generative and regenerative currents are encountered since field forcing is used both on acceleration and deceleration.

The slide 128 is shown in the FIGURE 2 as closing the switch 131 which will actuate the relay 134 when switch 69 is closed. This energizes the suicide relay SR so that the field winding 17 is supplied from the armature 22 and is not in a suicide connection with the armature 16. The closed contact 134B will establish a reference voltage across the terminals 109 and 115. This reference voltage will be that determined by the potentiometer 137 and would preferably establish a fast downward stroke of the slide 128. Just before the upper platen on the slide 128 comes in contact with the sheet metal resting on the lower platen, the switch 132 will be closed and the switch 131 will be opened. The potentiometer 138 will thus be placed in circuit which establishes a reference voltage such that a considerably slower downward speed of the slide 128 is indicated. Because of the lowering generator voltage, a regenerative current would thus flow in the armature loop circuit in order to rapidly decelerate the armature 12 for the drawing operation. At the completion of the drawing operation, the switch 133 would be closed and switch 132 opened so that potentiometer 139 controls the speed for the upward stroke of the slide 128. This would preferably be a high speed in order to save time. The switch 132 would not control the circuit during the upward motion of the slide 128. The setting of the potentiometer 139 which calls for a high speed of the armature 12 would cause a rapid in-rush of current for acceleration and this would be limited only by the current limit circuit 45.

At the top of the stroke of the slide 128, the switch 131 would be closed to again place the relay 134 and potentiometer 137 in operation and repeat the cycle, unless the switch 69 were opened. The press drive and control system as actually constructed achieved acceleration and deceleration of zero speed to full speed of a 500 horsepower motor in one-half second using field forcing, current limit acceleration and suicide field connection despite the fact that the motor and generator fields had a time constant of from eight to twelve seconds for a 98 percent change.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A generator control system for a reversible current direct current generator having an armature, said system comprising, first and second field windings for said generator, means for energizing said second field winding at a relatively fixed value of ampere turns, said fixed value of ampere turns establishing at least twice rated output voltage of said generator armature, a controllable gas-filled rectifier having a variable output voltage across output terminals thereof, means for connecting said first field winding to said rectifier output terminals for energization in a sense reverse to that of said second field winding, said first field winding capable of establishing substantially twice the ampere turns of field for said armature as said second field winding, thereby enabling a variable field and variable generated output voltage of from at least twice rated value in one sense to at least twice rated value in the opposite sense for a field forcing effect, and current limit means responsive to the output of said generator armature in both senses to limit the output of said rectifier to thus limit the current delivered by said generator armature to a given value proportionate to the rated output of said generator armature.

2. A control system for a direct current generator having an armature, comprising, first and second field windings for said generator, a unidirectional voltage regulatable device, means for connecting said first field winding to be responsive to the voltage of said device, means for establishing a substantially fixed field in said generator by said second field winding, means responsive to the voltage of said generator armature for controlling said device, said first and second field windings establishing fields in opposition with said first field winding capable of establishing a materially greater field than said second field winding, and means connected to said device and responsive to the current in said generator armature to dominate said voltage responsive means at currents in excess of a predetermined amount in the control of said device.

3. A motor control system for a direct current motor having an armature, comprising, a direct current generator having an armature and a first field winding, means for connecting said motor armature to be responsive to the voltage of said generator armature, a unidirectional voltage regulatable device, means for connecting said first field winding to said device to be responsive to the voltage thereof to establish a first field for said generator, means for establishing a substantially fixed second field in said generator, means responsive to the voltage of said motor armature for controlling said device, said first and second fields being in opposition with said first field winding capable of establishing a substantially greater field than said second field, and means connected to said device and responsive to the current in said motor armature to dominate said voltage responsive means at currents in excess of a predetermined amount in the control of said device.

4. A motor control system for a direct current motor having an armature, comprising, a direct current generator having an armature and first and second field windings, means for connecting said motor armature to be responsive to the voltage of said generator armature, a unidirectional voltage regulatable device, means for connecting said first field winding to said device to be responsive to the voltage thereof, means for establishing a substantially fixed field in said generator by said second field winding, said first and second field windings establishing fields in opposition with said first field winding capable of establishing substantially twice the field of said second field winding, means responsive to the voltage of said motor armature for controlling said device, and means connected to said device and responsive to the current in said motor armature to dominate said voltage responsive means at currents in excess of a predetermined amount in the control of said device.

5. A motor control system for a direct current motor having an armature, comprising, generator means having an armature, means for connecting said motor armature to be responsive to the output of said generator armature, field means for said generator means including first and second field windings, means for energizing said second field winding at a relatively fixed value, a controllable rectifier having two control terminals and two output terminals, said first and second windings establishing fields in opposition and said first field winding being capable of creating a greater number of ampere turns than said second field winding, a direct current reference voltage, an impedance having a tap and connected responsive to the output of said generator armature, a connection from said impedance to one control terminal of said rectifier, a connection from the other control terminal of said rectifier to said reference voltage, a connection from the tap of said impedance to said reference voltage, first switch means with first and second alternative conditions and in said first condition connecting said field means to be responsive to the output of said generator armature in one polarity and in said second condition connecting said field means to be responsive to the output of said rectifier in the opposite polarity, and means to select different values of said reference voltage when said first switch means is in said second condition.

6. A motor control system for a reversible direct current motor having an armature, comprising a first generator having an armature, means for connecting said motor armature to be responsive to the output of said generator armature, a first field winding for said first generator, a control generator having second and third field windings and an armature, means for energizing said second field winding at a relatively fixed value, a controllable rectifier having two control terminals and two output terminals, means for connecting said third field winding to be responsive to the output of said rectifier, said second and third field windings establishing fields in opposition and said third field winding being capable of creating twice the ampere turns of said second field winding, a direct current reference voltage, first and second impedances having taps and connected across said control generator armature and said motor armature, respectively, a connection from said second impedance to one control terminal of said rectifier, a connection from the other control terminal of said rectifier to said reference voltage, a connection from the tap of said second impedance to said reference voltage, first switch means with first and second alternative conditions and in said first condition connecting said first field winding to said first generator armature in one polarity and in said second condition connecting said first field winding to be responsive to the output of said control generator armature in the opposite polarity, second switch means actuated in accordance with said first switch means to interconnect the taps of said two impedances when said first switch means is in said first condition, and means to select the value of said reference voltage when said first switch means is in said second condition.

7. A motor control system for a direct current motor having an armature driving a load having inertia, comprising, a main generator having an armature connected in loop circuit with said motor armature, a main field winding for said main generator, a control generator having first and second field windings and an armature, means for energizing said second field winding at a relatively fixed value, a controllable rectifier having two control terminals and two output terminals, means for connecting said first field winding to said rectifier output terminals, said first and second field windings establishing fields in opposition and said first field winding being capable of creating twice the ampere turns of said second field winding, a direct current reference voltage, first and second impedances having taps and connected across said control and main generator armatures, respectively, a connection from said loop circuit to one control terminal of said rectifier, a connection from the other control terminal of said rectifier to said reference voltage, a connection from the tap of said second impedance to said reference voltage, first switch means with first and second alternative conditions and in said first condition connecting said main field winding to said main generator armature in one polarity and in said second condition connecting said main field winding to said control generator armature in the opposite polarity, second switch means actuated in accordance with said first switch means to interconnect the taps of said two impedances when said first switch means is in said first condition, and means to selectively connect different values of said reference voltage to said rectifier control terminals when said first switch means is in said second condition.

8. A motor control system for a direct current motor having an armature driving a load having inertia, comprising, a main generator having an armature connected in loop circuit with said motor armature, a main field winding for said main generator, a control generator having first and second field windings and an armature, means for energizing said second field winding at a relatively fixed value, a controllable rectifier having two control terminals and two output terminals, means for connecting said first field winding to said rectifier output terminals, said first and second field windings establishing fields in opposition and said first field winding being capable of creating twice the ampere turns of said second field winding, a direct current reference voltage, first and second impedances having taps and connected across said control and main generator armatures, respectively, a connection from said loop circuit to one control terminal of said rectifier, a connection from the other control terminal of said rectifier to said reference voltage, a connection from the tap of said second impedance to said reference voltage, first switch means with first and second alternative conditions and in said first condition connecting said main field winding to said main generator armature in one polarity and in said second condition connecting said main field winding to said control generator armature in the opposite polarity, second switch means actuated in accordance with said first switch means to interconnect the taps of said two impedances when said first switch means is in said first condition, means to select different values of said reference voltage when said first switch means is in said second condition, and means to actuate said switch means in accordance with the movement of said load.

9. A motor control system for a direct current motor having an armature, comprising, generator means having an armature, means for connecting said motor armature to be responsive to the output of said generator means, field means for said generator means including first and second field windings for said generator means, means for energizing said second field winding at a relatively fixed value, a controllable rectifier having two control terminals and two output terminals, said first and second field windings establishing fields in opposition and said first field winding being capable of creating substantially twice the ampere turns of said second field winding, the voltage at said rectifier output terminals being sufficient to establish a steady-state current materially greater than rated current in said first field winding, a direct current reference voltage, an impedance having a tap and connected responsive to the output of said generator armature, a connection from said impedance to one control terminal of said rectifier, a connection from the other control terminal of said rectifier to said reference voltage, a connection from the tap of said impedance to said reference voltage, first switch means with first and second alternative conditions and in said first condition connecting said field means to be responsive to the output of said generator armature in one polarity and in said second condition connecting said field means to be responsive to the output of said rectifier in the opposite polarity, means to select the value of said reference voltage when said first switch means is in said second condition, and means connected to said rectifier to control same to limit the current in said motor armature to a predetermined value therethrough.

10. A motor control system for a direct current motor having an armature, comprising, a first generator having an armature, means for connecting said armature to be responsive to the output of said generator, a first field winding for said first generator, a control generator having second and third field windings and an armature, means for energizing said second field winding at a relatively fixed value to give substantially twice rated output voltage of said control generator armature, a controllable rectifier having two control terminals and two output terminals, means for connecting said third field winding to be responsive to the output of said rectifier, said second and third field windings establishing fields in opposition and said third field winding being capable of creating substantially twice the ampere turns of said second field winding, the voltage at said rectifier output terminals being sufficient to establish steady-state conditions of at least four times rated current in said third field winding, a direct current reference voltage, first and second impedances having taps and connected across said control generator armature and said motor armature, respectively, a connection from said second impedance to one control terminal of said rectifier, a connection from the other control terminal of said rectifier to said reference voltage, a connection from the tap of said second impedance to siad reference voltage, first switch means with first and second alternative conditions and in said first condition connecting said first field winding to said first generator armature in one polarity and in said second condition connecting said first field winding to be responsive to the output of said control generator armature in the opposite polarity, second switch means actuated in accordance with said first switch means to interconnect the taps of said two impedances when said first switch means is in said first condition, means to select the value of said reference voltage when said first switch means is in said second condition, and means connected to said rectifier to control same to limit the current in said motor armature to a predetermined value on both generative and regenerative currents therethrough.

11. A motor control system for a direct current motor having an armature driving a load having inertia, comprising, a main generator having an armature connected in loop circuit with said motor armature, a main field winding for said main generator, a control generator having first and second field windings and an armature, means for energizing said second field winding at a relatively fixed value to give substantially twice rated output voltage of said generator armature, a controllable rectifier having two control terminals and two output terminals, means for connecting said first field winding to said rectifier output terminals, said first and second field windings establishing fields in opposition and said first field winding being capable of creating substantially twice the ampere turns of said second field winding, the voltage at said rectifier output terminals being sufficient to establish steady-state conditions of at least four times rated current in said first field winding, a plurality of direct current reference voltages, first and second impedances having taps and connected across said control and main generator armatures, respectively, a connection from said loop circuit to one control terminal of said rectifier, a connection from the other control terminal of said rectifier to said reference voltages, a connection from the tap of said second impedance to said reference voltages, first switch means with first and second alternative conditions and in said first condition connecting said main field winding to said main generator armature in one polarity and in said second condition connecting said main field winding to said control generator armature in the opposite polarity, second switch means actuated in accordance with said first switch means to interconnect the taps of said two impedances when said first switch means is in said first condition, third switch means to selectively connect one of said plurality of reference voltages to said rectifier control terminals when said first switch means is in said second condition, and means connected to said rectifier to control same to limit the current in said motor armature to a predetermined value on both generative and regenerative currents therethrough.

12. A motor control system for a reversible direct current motor having an armature, comprising a first generator having an armature, means for connecting said motor armature to be responsive to the output of said generator armature, a first field winding for said first generator energizable at a given number of ampere turns to establish a rated output of said first generator, a control generator having second and third field windings and an armature, means for energizing said second field winding at a relatively fixed value, a controllable rectifier having control terminals and an output, means for connecting said third field winding to be responsive to the output of said rectifier, said second and third field windings establishing fields in opposition and said third field winding being capable of creating substantially twice the ampere turns of said second field winding, means for connecting said first field winding to the output of said control generator with the output thereof capable of establishing a much greater number than said given number of ampere turns in said first field winding for a field forcing effect on said first generator, and means for establishing a feedback from said motor armature voltage to said rectifier control terminals.

13. A motor control system for a reversible direct current motor having an armature, comprising a first generator having an armature, means for connecting said motor armature to be responsive to the output of said generator armature, a first field winding for said first generator energizable at a given number of ampere turns to establish rated output of said first generator, a control generator having second and third field windings and an armature, means for energizing said second field winding at a relatively fixed value, a controllable rectifier having control terminals and an output, means for connecting said third field winding to be responsive to the output of said rectifier, said second and third field windings establishing fields in opposition and said third field winding being capable of creating substantially twice the ampere turns of said second field winding, means for connecting said first field winding to the output of said control generator with the output thereof capable of establishing a much greater number than said given number of ampere turns in said first field winding for a field forcing effect on said first generator, means for establishing a feedback from said motor armature voltage to said rectifier control terminals, and current limit means responsive to the output of said generator armature in both senses to limit the output of said rectifier to thus limit the current delivered by said generator armature to a given value proportionate to the rated output of said generator armature.

References Cited in the file of this patent

UNITED STATES PATENTS

| | | |
|---|---|---|
| 2,312,178 | Levison et al. | Feb. 23, 1943 |
| 2,313,503 | Baldwin | Mar. 9, 1943 |
| 2,498,280 | King | Feb. 21, 1950 |
| 2,519,339 | Avery | Aug. 22, 1950 |
| 2,575,717 | King | Nov. 20, 1951 |
| 2,636,692 | Picking | Apr. 28, 1953 |